US012624811B2

(12) United States Patent
Kwon et al.

(10) Patent No.: US 12,624,811 B2
(45) Date of Patent: May 12, 2026

(54) VEHICLE LAMP

(71) Applicant: HYUNDAI MOBIS CO., LTD., Seoul (KR)

(72) Inventors: Eun Bi Kwon, Yongin-si (KR); Min Ji Jin, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/926,017

(22) Filed: Oct. 24, 2024

(65) Prior Publication Data

US 2025/0305649 A1 Oct. 2, 2025

(30) Foreign Application Priority Data

Mar. 26, 2024 (KR) ........................ 10-2024-0041358

(51) Int. Cl.
*F21S 41/25* (2018.01)
*F21S 41/143* (2018.01)
*F21S 41/151* (2018.01)

(52) U.S. Cl.
CPC ............. *F21S 41/25* (2018.01); *F21S 41/143* (2018.01); *F21S 41/151* (2018.01)

(58) Field of Classification Search
CPC ...... F21S 41/143; F21S 41/151; F21S 41/153; F21S 41/25; F21S 41/26; F21S 41/265; F21S 41/27; F21S 41/275
See application file for complete search history.

(56) References Cited

U.S. PATENT DOCUMENTS 10,724,700 B2 * 7/2020 De Lamberterie ..... F21S 41/27
10,955,102 B1 * 3/2021 Lee ....................... F21S 41/151

* cited by examiner

*Primary Examiner* — Matthew J. Peerce
(74) *Attorney, Agent, or Firm* — NSIP Law

(57) ABSTRACT

A vehicle lamp including a light source part including a plurality of light sources configured to generate light, a light condensing lens part provided in front of the light source part, corresponding to the plurality of light sources, and including a plurality of light emitting surfaces from which the light is emitted, and a first emission lens part provided in front of the light condensing lens part, the first emission lens part being configured to emit the light incident from the plurality of light sources to form a plurality of light distribution patterns, the plurality of light distribution patterns being configured to overlap each other to form a high beam pattern, and the light emitting surfaces being configured to form the light distribution patterns into a shape vertically asymmetric with respect to an optical axis.

9 Claims, 13 Drawing Sheets

10

10

VEHICLE LAMP

CROSS-REFERENCE TO RELATED APPLICATION

This application claims the benefit under 35 USC § 119(a) of priority to Korean Patent Application No. 10-2024-0041358, filed in the Korean Intellectual Property Office on Mar. 26, 2024, the entire disclosure of which is incorporated herein by reference for all purposes.

TECHNICAL FIELD

The present disclosure relates to a vehicle lamp.

BACKGROUND

Head lamps play an important role for safe traveling by forming a low beam pattern or a high beam pattern to secure forward vision of a driver during night traveling. In recent years, as the head lamps are gradually slimmed, slim lenses having a wide shape in a left-right direction are used for intelligent head lamps such as intelligent front-lighting systems (IFSs) or adaptive driving beam (ADB) lamps, which do not cause glare to a driver of a preceding vehicle.

In general, a projection-type optical system that implements an intelligent head lamp includes a combination of a primary optical system that collects and distributes light near a focal point and a secondary optical system that forms the focal point, a light distribution pattern, and the like of the optical system.

In the intelligent head lamp according to the related art, a reflector, a silicon rod optic, a general condensing lens, or the like is used as the primary optical system. However, when the reflector according to the related art is used, heat resistance problems occur due to miniaturization of the reflector. Accordingly, a heat sink and a fan are arranged vertically with respect to a light source, and thus a volume of the lamp increases.

Further, when the silicon rod optic according to the related art is used as the primary optical system, light condensing efficiency decreases in a small lamp (a lamp having an opening of 20 mm or less). Further, when the general condensing lens is used as the primary optical system, because a horizontal focal point and a vertical focal point are the same, and thus a thickness of the lens increases and optical efficiency of the lens decreases.

Thus, it is necessary to develop a technology that may implement a slim lamp by minimizing a volume while improving light distribution performance and optical efficiency of the intelligent head lamp.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, here is provided a vehicle lamp including a light source part including a plurality of light sources configured to generate light, a light condensing lens part provided in front of the light source part, corresponding to the plurality of light sources, and including a plurality of light emitting surfaces from which the light is emitted, and a first emission lens part provided in front of the light condensing lens part, the first emission lens part being configured to emit the light incident from the plurality of light sources to form a plurality of light distribution patterns, the plurality of light distribution patterns being configured to overlap each other to form a high beam pattern, and the light emitting surfaces being configured to form the light distribution patterns into a shape vertically asymmetric with respect to an optical axis.

A virtual focal surface may be a virtual plane passing through a virtual focal point that is a focal point formed behind the light condensing lens part as an optical path formed by optical characteristics of the first emission lens part extending from and perpendicular to the optical axis, a virtual pattern may be a virtual optical pattern formed on the virtual focal surface by a virtual optical path in which emitted light that is the light emitted from the first emission lens part extends to a rear side of the first emission lens part, and the virtual pattern may be formed asymmetrically in a vertical direction with respect to the virtual focal point.

The virtual pattern may be configured to be formed such that an upper area is smaller than a lower area with respect to the virtual focal point.

The virtual pattern may be configured to be formed symmetrically in a left-right direction with respect to the virtual focal point.

The light condensing lens part may include a plurality of light condensing lenses arranged in a left-right direction, each of the plurality of light condensing lenses including a plurality of unit lenses integrally formed and arranged in the left-right direction, and each of the unit lenses including the light emitting surface and a light incident surface which corresponds to the light emitting surface and into which the light emitted from the light source is incident.

The light emitting surface may be configured as a curved surface convex toward the front and may include a vertical curvature being different from a horizontal curvature of the light emitting surface.

The vehicle lamp may include a second emission lens part provided in front of the first emission lens part and formed in a second shape different from a first shape of the first emission lens part, the second emission lens part being configured to be bent rearward from one end to the other end with respect to the left-right direction.

The first emission lens part may include a plurality of optical lenses arranged in the left-right direction and respectively corresponding to the plurality of light condensing lenses, each of the optical lenses including an incident surface into which the light is incident from the light condensing lens and an emission surface configured to emit the light incident into the incident surface to the second emission lens part, and the emission surface being configured to be bent rearward from the other end to the one end with respect to the left-right direction.

Each of the optical lenses may be configured to form a virtual focal point behind a corresponding one of the light condensing lenses, and a first distance between a vertical virtual focal point and the incident surface of the optical lens may be greater than a second distance between a horizontal virtual focal point and the incident surface of the optical lens.

The plurality of light sources may be arranged in a left-right direction and arranged on the same plane.

BRIEF DESCRIPTION OF THE DRAWINGS

The above and other objects, features and advantages of the present disclosure will be more apparent from the following detailed description taken in conjunction with the accompanying drawings.

Figure 1:
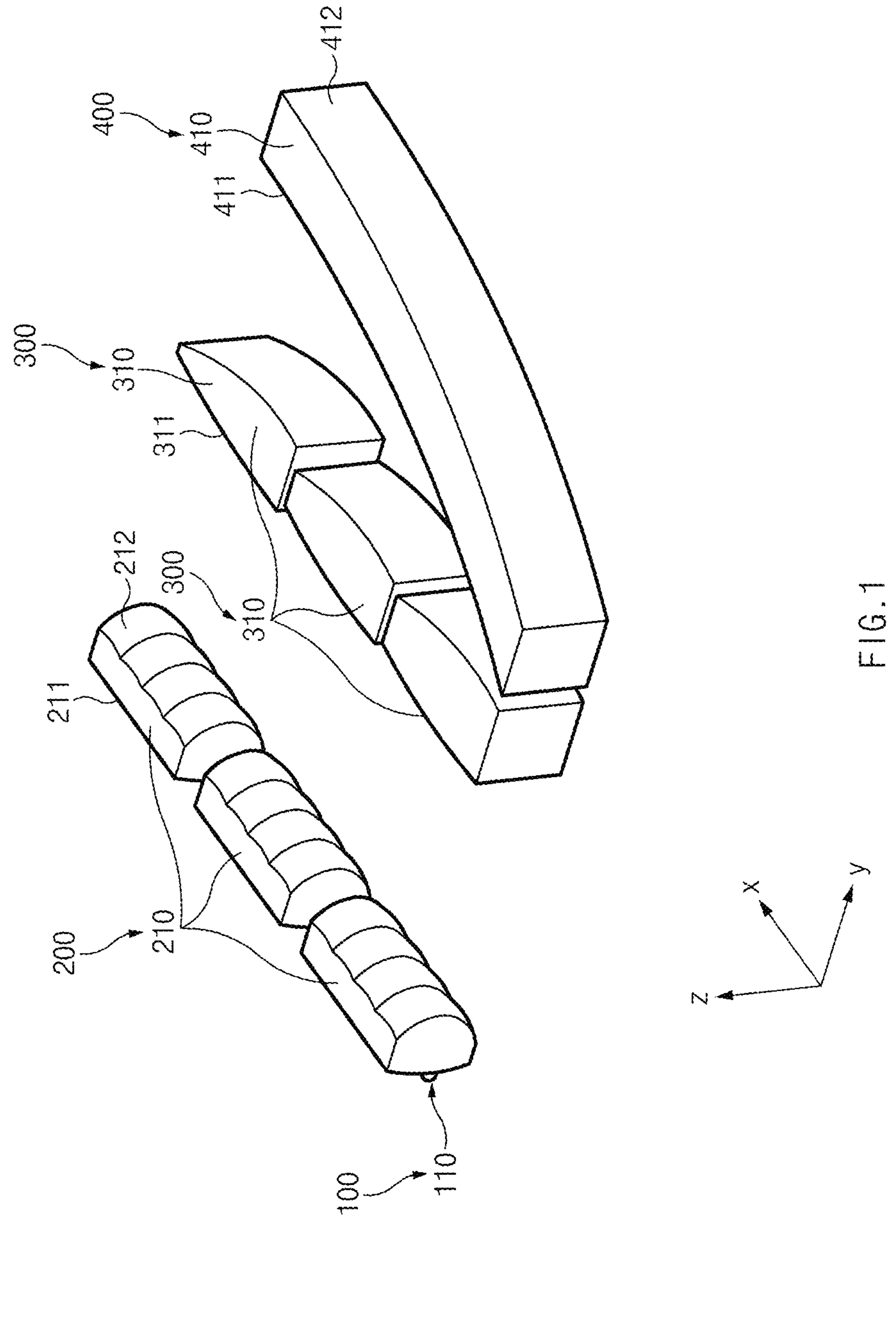
FIG. 1 is a perspective view illustrating a vehicle lamp according to an embodiment of the present disclosure.

Throughout the drawings and the detailed description, unless otherwise described or provided, the same, or like, drawing reference numerals may be understood to refer to the same, or like, elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

First, the embodiments described below are embodiments suitable for understanding technical features of a vehicle lamp according to the present disclosure. However, the present disclosure is not limited to the embodiments described below, the technical features of the present disclosure are not limited by the described embodiments, and various modifications may be made within the technical scope of the present disclosure.

Figure 2:
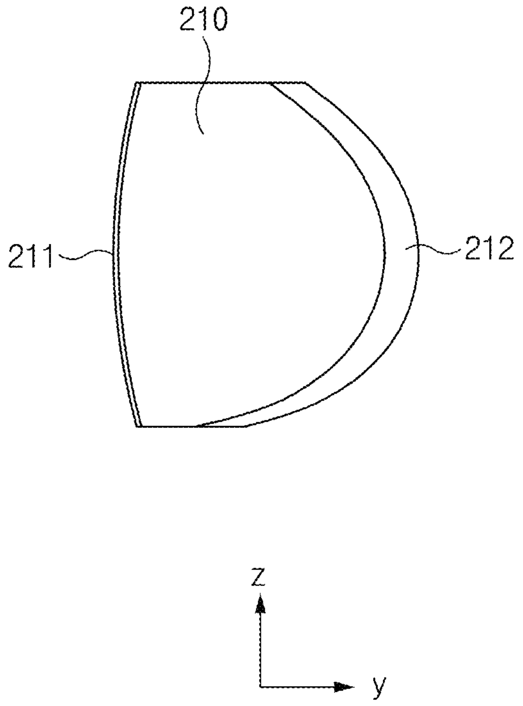
FIG. 2 is a side view of a unit lens according to the embodiment of the present disclosure when viewed from side.
Figure 3:
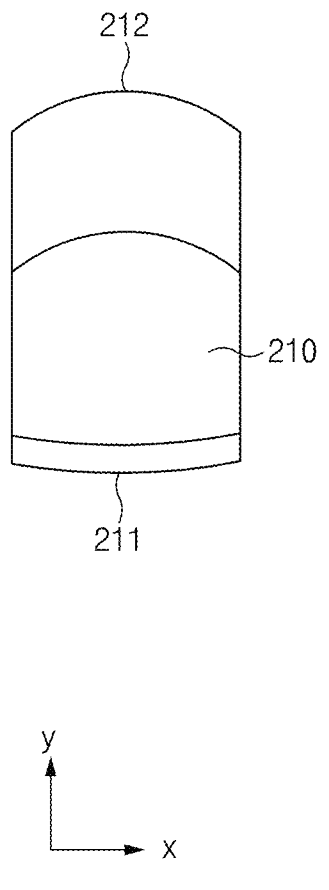
FIG. 3 is a plan view of the unit lens according to the embodiment of the present disclosure when viewed from above.
Figure 4:
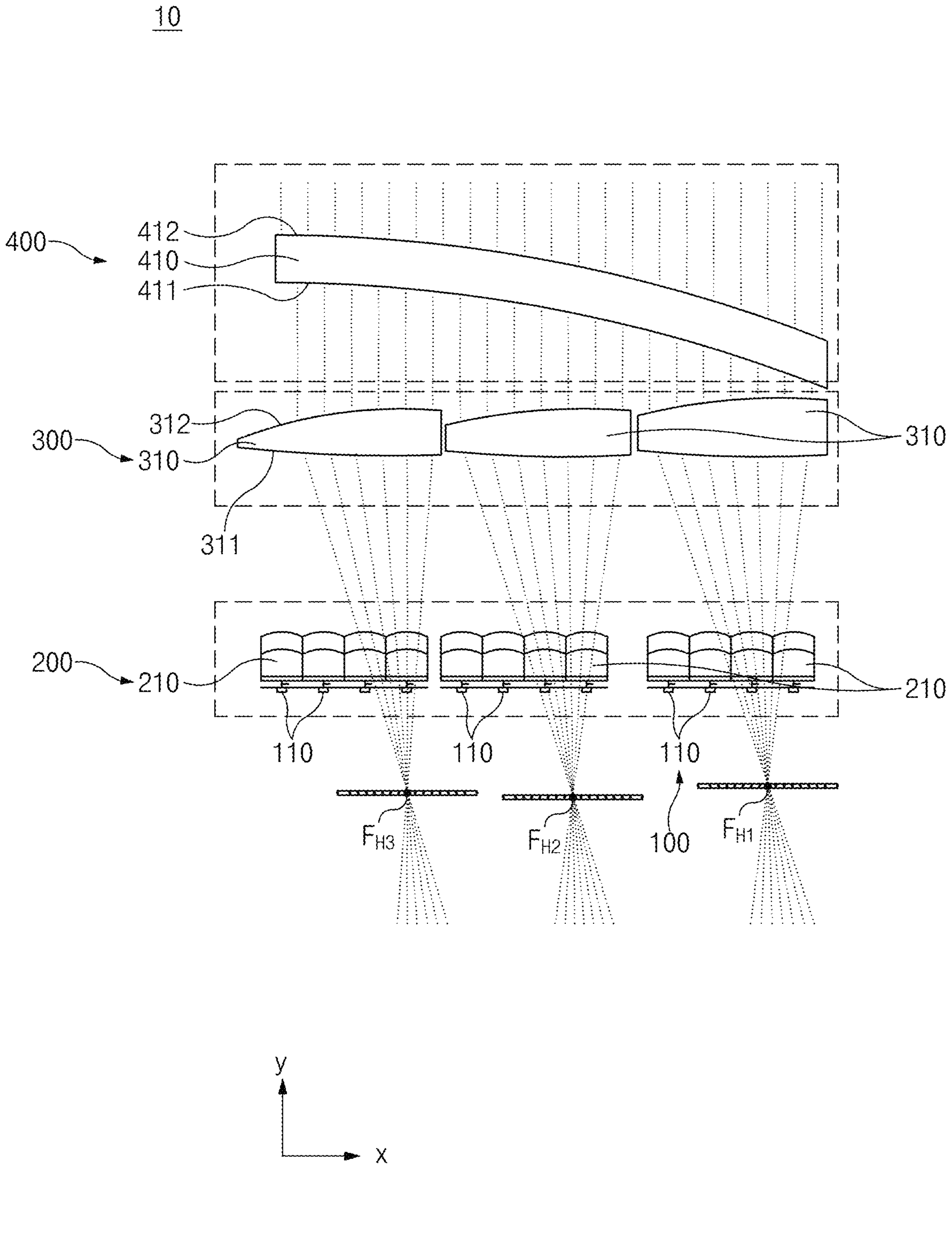
FIG. 4 is a plan view of the vehicle lamp according to the embodiment of the present disclosure when viewed from above.
Figure 5:
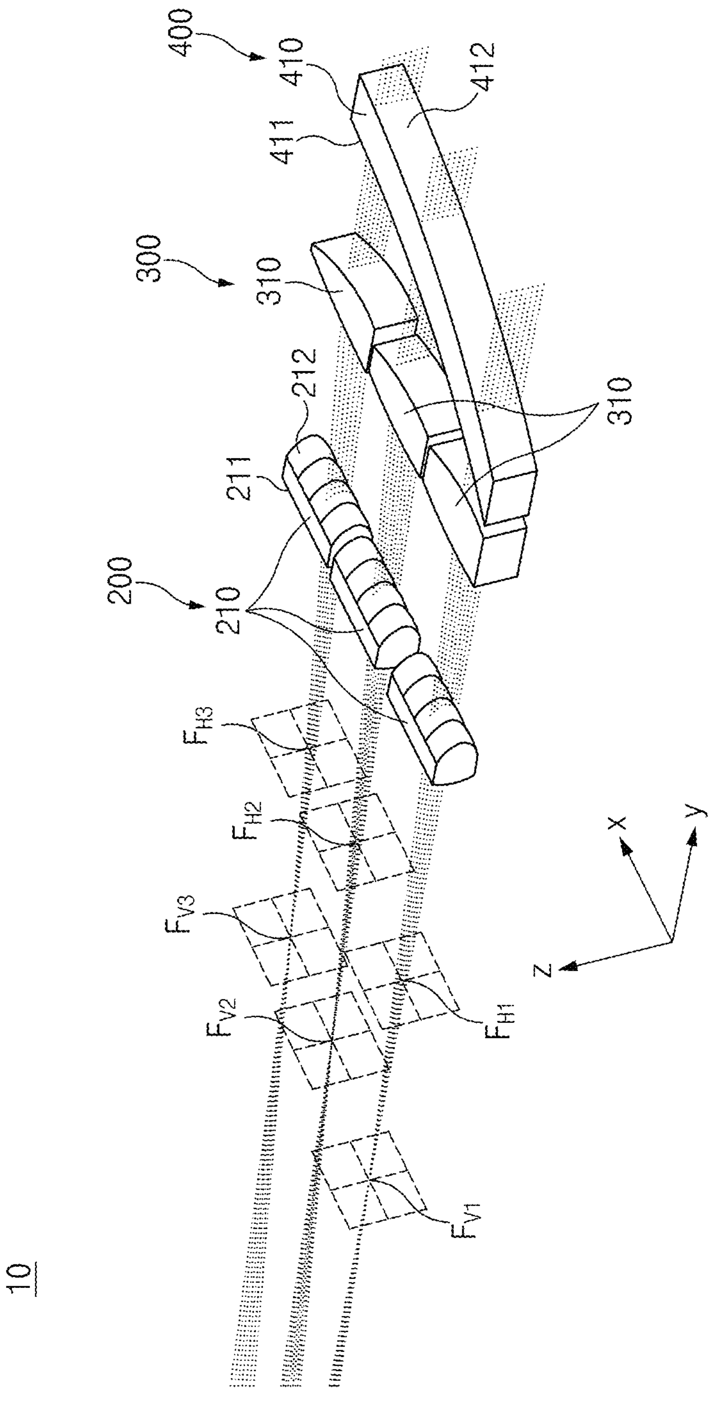
FIG. 5 is a perspective view of the vehicle lamp according to the embodiment of the present disclosure and is a view for describing a virtual focal point and a virtual focal surface by a first emission lens part.

FIG. 1 is a perspective view illustrating a vehicle lamp according to an embodiment of the present disclosure, FIG. 2 is a side view of a unit lens according to the embodiment of the present disclosure when viewed from side, FIG. 3 is a plan view of the unit lens according to the embodiment of the present disclosure when viewed from above, FIG. 4 is a plan view of the vehicle lamp according to the embodiment of the present disclosure when viewed from above, and FIG. 5 is a perspective view of the vehicle lamp according to the embodiment of the present disclosure and is a view for describing a virtual focal point and a virtual focal surface by a first emission lens part.

Figure 6:
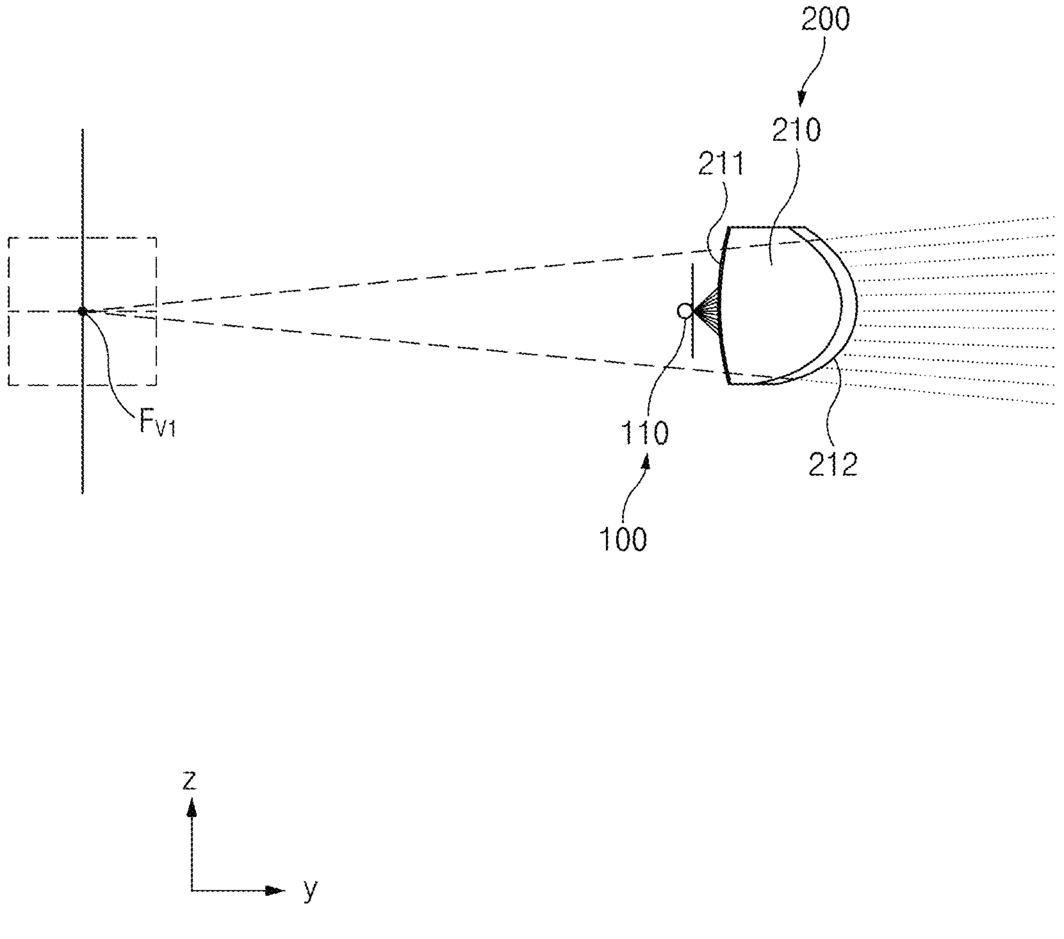
FIG. 6 is a view illustrating a vertical virtual focal point FV1 and the virtual focal surface according to optical characteristics of the first emission lens part.
Figure 7:
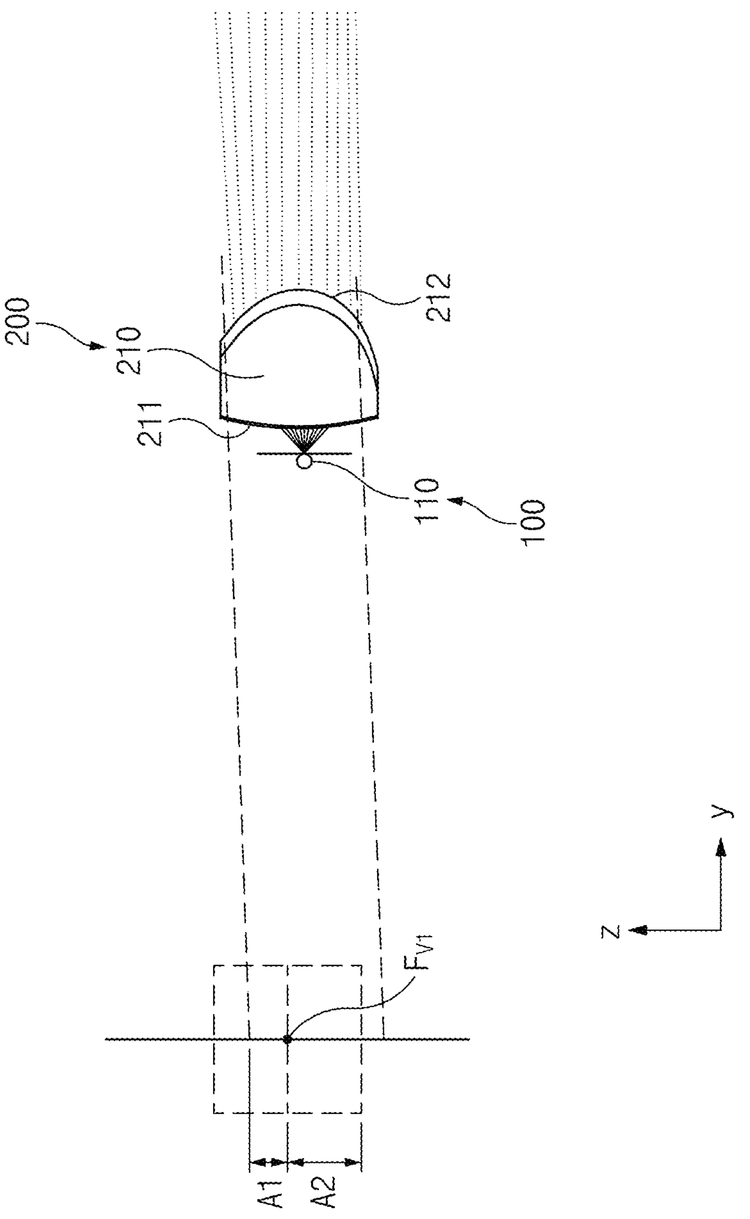
FIG. 7 is a view illustrating a virtual vertical optical path in which emitted light extends toward a rear side of the first emission lens part and a vertical virtual pattern formed on the virtual focal surface by the virtual vertical optical path.
Figure 8:
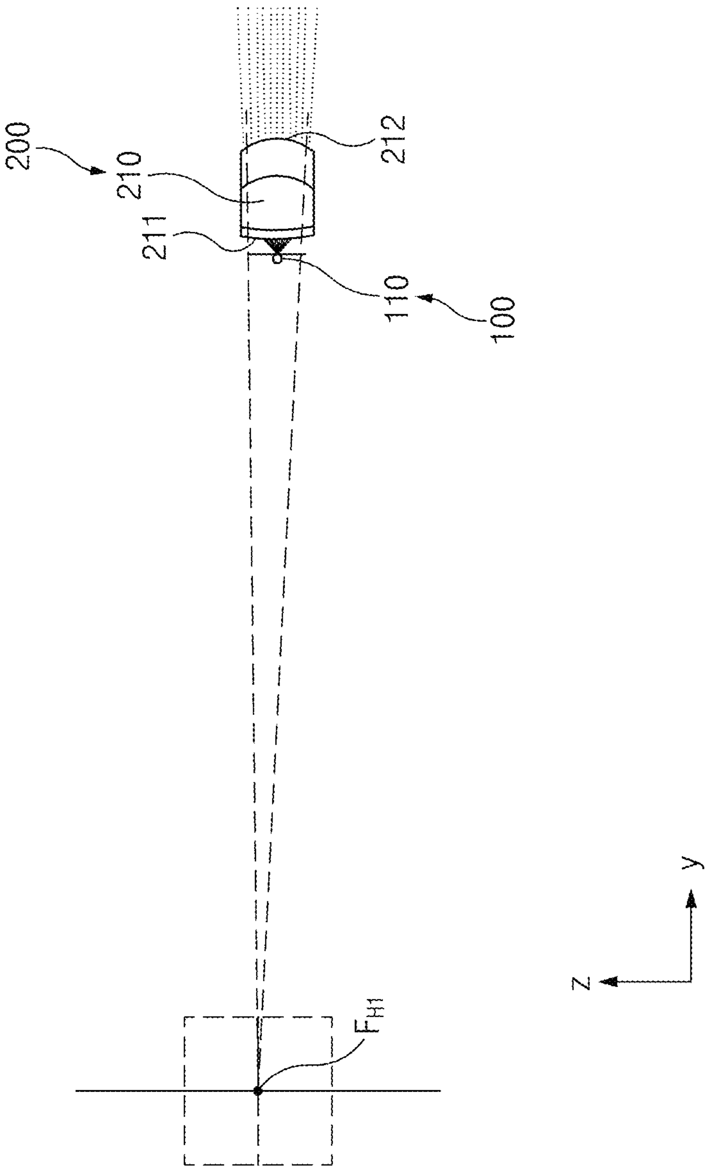
FIG. 8 is a view illustrating a horizontal virtual focal point FH1 and the virtual focal surface according to optical characteristics of the first emission lens part.
Figure 9:
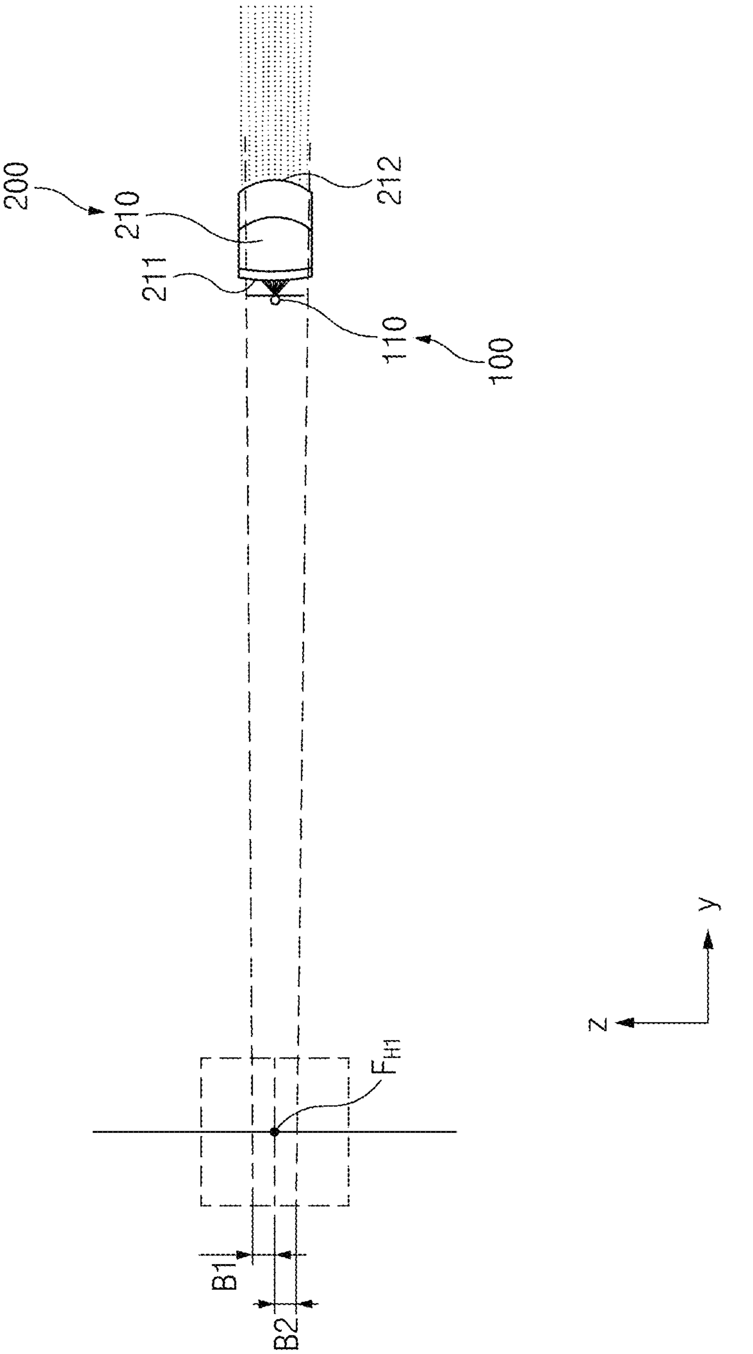
FIG. 9 is a view illustrating a virtual horizontal optical path in which the emitted light extends toward the rear side of the first emission lens part and a horizontal virtual pattern formed on the virtual focal surface by the virtual horizontal optical path.

FIG. 6 is a view illustrating a vertical virtual focal point FV1 and the virtual focal surface according to optical characteristics of the first emission lens part, FIG. 7 is a view illustrating a virtual vertical optical path in which emitted light extends toward a rear side of the first emission lens part and a vertical virtual pattern formed on the virtual focal surface by the virtual vertical optical path, FIG. 8 is a view illustrating a horizontal virtual focal point FH1 and the virtual focal surface according to optical characteristics of the first emission lens part, and FIG. 9 is a view illustrating a virtual horizontal optical path in which the emitted light extends toward the rear side of the first emission lens part and a horizontal virtual pattern formed on the virtual focal surface by the virtual horizontal optical path.

Figure 10A:
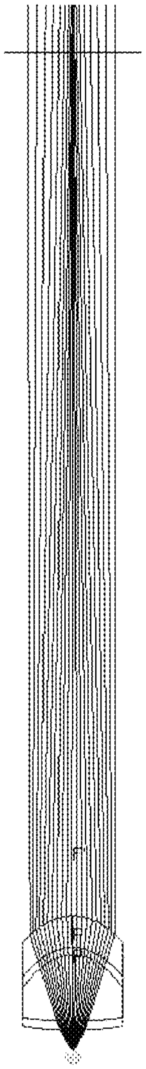
FIG. 10A is a view illustrating a horizontal optical path by the unit lens according to an example of the present disclosure.
Figure 10B:
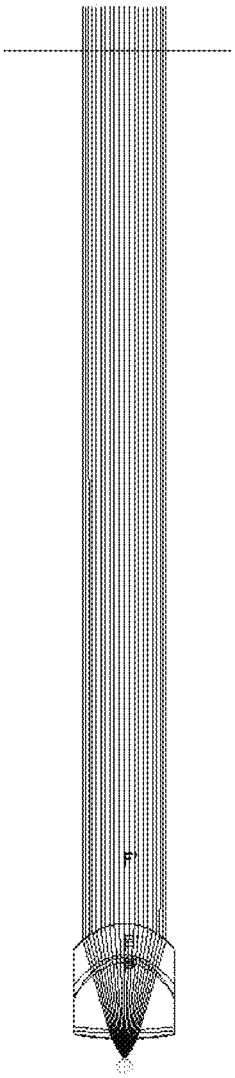
FIG. 10B is a view illustrating the horizontal optical path when an optical path by the unit lens is viewed from above according to a comparative example of the present disclosure.
Figure 11A:
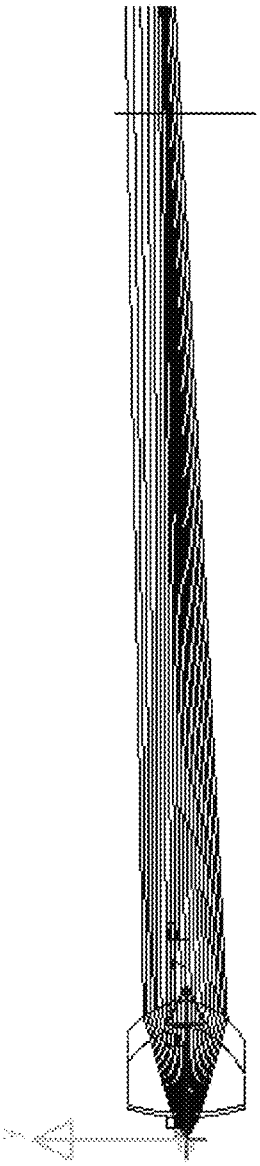
FIG. 11A is a view illustrating a vertical optical path by the unit lens according to the example of the present disclosure.
Figure 11B:
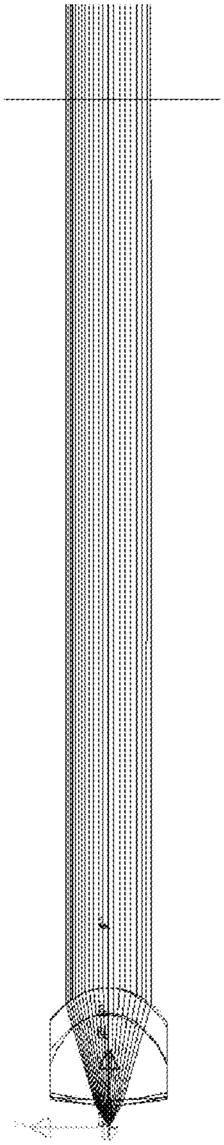
FIG. 11B is a view illustrating the vertical optical path when the optical path by the unit lens is viewed from above according to the comparative example of the present disclosure.
Figure 12A:
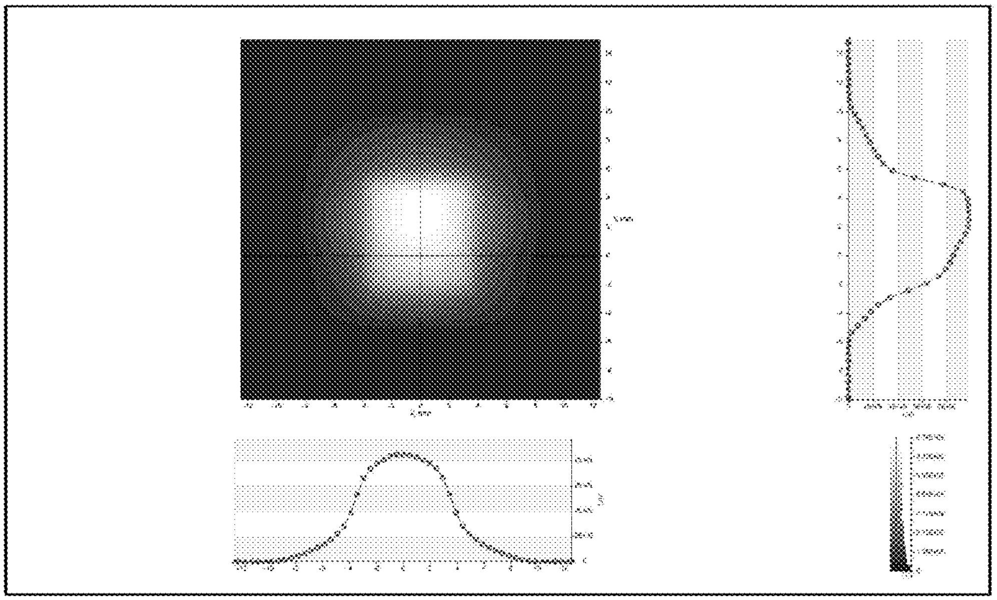
FIG. 12A is an image illustrating a light distribution pattern when the unit lens according to the example of the present disclosure is used.
Figure 12B:
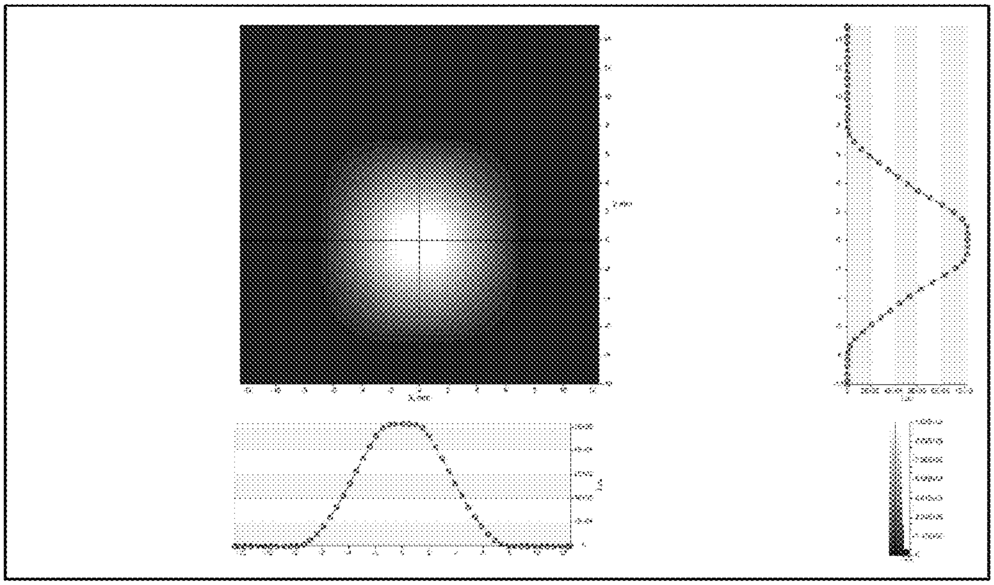
FIG. 12B is an image illustrating the light distribution pattern when the unit lens according to the comparative example of the present disclosure is used.
Figure 13:
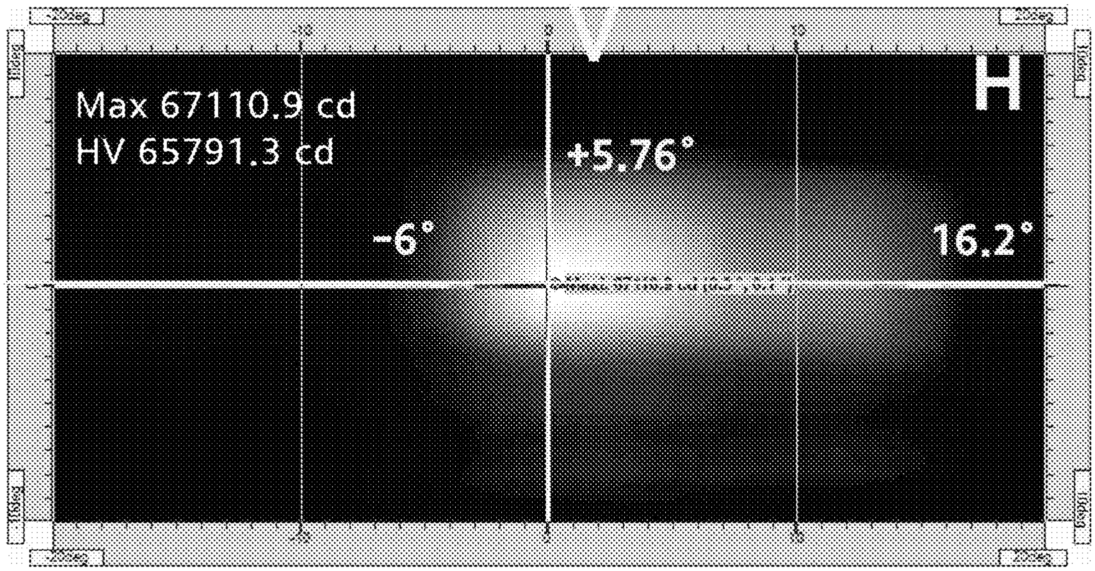
FIG. 13 is an image illustrating a high beam pattern according to the embodiment of the present disclosure.

FIG. 10A is a view illustrating a horizontal optical path by the unit lens according to an example of the present disclosure, FIG. 10B is a view illustrating the horizontal optical path when an optical path by the unit lens is viewed from above according to a comparative example of the present disclosure, FIG. 11A is a view illustrating a vertical optical path by the unit lens according to the example of the present disclosure, FIG. 11B is a view illustrating the vertical optical path when the optical path by the unit lens is viewed from above according to the comparative example of the present disclosure, FIG. 12A is an image illustrating a light distribution pattern when the unit lens according to the example of the present disclosure is used, FIG. 12B is an image illustrating the light distribution pattern when the unit lens according to the comparative example of the present disclosure is used, and FIG. 13 is an image illustrating a high beam pattern according to the embodiment of the present disclosure.

Referring to FIGS. 1 to 13, a vehicle lamp 10 according to an embodiment of the present disclosure includes a light source part 100, a light condensing lens part 200, and a first emission lens part 300. Further, the vehicle lamp 10 according to an embodiment of the present disclosure may further include a second emission lens part 400.

Hereinafter, a direction in which light is emitted from the first emission lens part 300 and the second emission lens part 400 is referred to as a forward direction, an opposite direction to the forward direction is referred to as a rearward direction, and the forward direction and the rearward direction together are referred to as a front-rear direction "y." Further, a direction perpendicular to the front-rear direction "y" and parallel to the ground is referred to as a left-right direction "x." Further, a direction perpendicular to the front-rear direction "y" and the left-right direction "x" is referred to as an up-down direction "z" or a vertical direction "z."

The light source part 100 includes a plurality of light sources 110 that generate light.

Various elements or devices capable of emitting light may be used as the light source 110. For example, the light source 110 may be a light emitting diode (hereinafter, referred to as LED), but the present disclosure is not limited thereto, and various lamps such as laser diodes, bulbs, halogen lamps, and xenon lamps (HID) may be applied thereto.

The light source part 100 may include the plurality of light sources 110, and the number and arrangement of the light sources 110 may be determined according to design specifications of the vehicle lamp 10. For example, the plurality of light sources 110 may be arranged in the left-right direction "x" and may be classified into a plurality of groups. Here, the plurality of light sources 110 may be turned on or off in groups or individually. However, the arrangement and number of the plurality of light sources 110 are not limited to the illustrated embodiment.

The light condensing lens part 200 may be provided in front of the light source part 100. Further, the light condensing lens part 200 may include a plurality of light emitting surfaces 212 that correspond to the plurality of light sources 110 and emit light.

The first emission lens part 300 is provided in front of the light condensing lens part 200 and emits light incident from the plurality of light sources 110 to form a plurality of light distribution patterns. Further, the plurality of light distribution patterns may overlap each other to form a high beam pattern (see FIG. 13).

For example, as in the illustrated embodiment, the plurality of light emitting surfaces 212 may be classified into the plurality of groups, and the first emission lens part 300 may be formed to be separated as a lens structure corresponding to groups of the plurality of light emitting surfaces 212. However, the shapes of the light condensing lens part 200 and the first emission lens part 300 are not limited thereto.

Meanwhile, the second emission lens part 400 may be provided in front of the first emission lens part 300 and may be formed in a shape different from that of the first emission lens part 300.

Further, the second emission lens part 400 may be formed to be bent rearward from one end to the other end in the left-right direction "x." For example, the one end may be a center of the vehicle or an inboard side direction, and the other end may be an outboard side direction. A bending direction and degree of the second emission lens part 400 may be determined according to a shape of an exterior of the vehicle.

In detail, the second emission lens part 400 may include a lens body 410, a rear surface 411 into which the light emitted from the first emission lens part 300 is incident, and a front surface 412 through which the incident light is emitted. The front surface 412 and the rear surface 411 may be formed to be bent in the same direction. Meanwhile, the light emitting surface 212 provided in the light condensing lens part 200 according to the embodiment of the present disclosure may be formed such that the light distribution pattern is formed in a vertical asymmetric shape with respect to an optical axis.

In detail, according to the embodiment of the present disclosure, the first emission lens part 300 may include an optical lens forming a focal point, and accordingly, the emitted light may form the light distribution pattern. In addition, according to the embodiment of the present disclosure, an intended light distribution pattern may be formed during design by correcting an optical path through the light condensing lens part 200 that serves to condense the light emitted from the light source 110.

In more detail, a diffusion angle of the emitted light, which is light emitted from the first emission lens part 300, may be adjusted by optical characteristics of the light emitting surface 212. Here, the optical characteristics of the light emitting surface 212 mean a refractive index, an aspherical coefficient, a curvature, and the like of the light emitting surface 212. When the light emitting surface 212 is designed, the optical characteristics of the light emitting surface 212 may be adjusted to form the intended light distribution pattern in consideration of the optical path by the first emission lens part 300.

For example, the light emitting surface 212 of the light condensing lens part 200 may be formed in an aspherical shape of which a vertical focal point and a horizontal focal point are different from each other. A horizontal optical path and a vertical optical path of the emitted light may be changed according to the shape, the curvature, or the like of the light emitting surface 212.

Thus, in the embodiment of the present disclosure, the shape of the light emitting surface 212 may be formed to form the diffusion angle of the emitted light so that the plurality of light distribution patterns may satisfy design specifications, laws, light distribution performance, and the like.

Further, according to an embodiment of the present disclosure, light condensing efficiency may be improved by the light condensing lens part 200, and at the same time, distortion according to a bent shape of the second emission lens part 400 may be corrected through individual design of the plurality of light emitting surfaces 212. Thus, optical efficiency of the vehicle lamp 10 may be improved. An individual light distribution pattern may be designed in consideration of an exterior of the vehicle and a curvature of the second emission lens part 400 according to the exterior of the vehicle by the light condensing lens part 200 according to the embodiment of the present disclosure.

Meanwhile, the plurality of light sources 110 may be arranged in the left-right direction "x" and may be arranged on the same plane.

In detail, according to an embodiment of the present disclosure, the light source 110, the light condensing lens part 200, the first emission lens part 300, and the second emission lens part 400 may be arranged in the front-rear direction "y," and the light distribution pattern may be individually designed. Thus, the light sources 110 may be arranged in the left-right direction "x," and may be arranged on the same plane.

Accordingly, a heat sink to which the plurality of light sources 110 are attached may be integrated. When a reflector according to the related art is used, the heat sink is located under the light source, and thus the plurality of light sources arranged in a horizontal direction or a vertical direction may not be arranged on the same plane. Accordingly, the plurality of light sources may not be mounted on one heat sink, and thus a volume of the vehicle lamp increases.

According to the embodiment of the present disclosure, since the heat sink may be integrated, a volume of the vehicle lamp 10 may be minimized as compared to the related art, and thus a slim lamp in the left-right direction "x" may be implemented.

In the specification, focal points formed behind the light condensing lens part 200 as an optical path formed by optical characteristics of the first emission lens part 300 extends are referred to as virtual focal points FV1, FV2, FV3, FH1, FH2, and FH3, and a virtual plane passing through the focal point and perpendicular to the optical axis is referred to as a virtual focal surface. Further, a virtual light pattern formed on the virtual focal surface by a virtual optical path through which the emitted light extends to the rear side of the first emission lens part 300 is defined as a virtual pattern.

In this case, the virtual pattern may be formed asymmetrically in the vertical direction "z" with respect to the virtual focal points FV1, FV2, and FV3. Accordingly, the light distribution pattern may be formed in a shape that is vertically asymmetric with respect to the optical axis.

In detail, for example, the virtual pattern may be formed such that an upper area (see A1 in FIG. 7) is smaller than a lower area (see A2 in FIG. 7) with respect to the virtual focal points FV1, FV2, and FV3. Accordingly, the light distribution pattern or the high beam pattern emitted through the first emission lens part 300 may be formed such that an upper area is larger than a lower area with respect to the optical axis (see FIG. 13).

Accordingly, when an intelligent head lamp in which individual beam patterns are collected to form the high beam pattern is implemented using the embodiment of the present disclosure, required individual beam patterns may be easily implemented. Here, the intelligent head lamp may be an intelligent front-lighting system (IFS) or an adaptive driving beam (ADB) lamp that does not cause glare to a driver of a preceding vehicle.

Further, the virtual pattern may be formed in left-right symmetry with respect to the virtual focal points FH1, FH2, and FH3. That is, referring to FIG. 9, in the virtual pattern, a left area (see B1 in FIG. 9) may be symmetrical to a right area (see B2 in FIG. 9) with respect to the virtual focal points FH1, FH2, and FH3. Accordingly, the light distribution patterns may overlap with each other, so that uniformity of the entire high beam pattern may be improved.

Hereinafter, detailed shapes of the light condensing lens part 200, the first emission lens part 300, and the second emission lens part 400 will be described with reference to the illustrated embodiment, and accordingly, formation of the virtual pattern and the light distribution pattern will be described in detail.

Referring to FIGS. 1 to 5, the light condensing lens part 200 may further include a plurality of light condensing lenses 210 arranged in the left-right direction "x." Further, each of the plurality of light condensing lenses 210 may include a plurality of unit lenses integrally formed and arranged in the left-right direction "x."

Here, each of the unit lenses may include the light emitting surface 212 and a light incident surface 211. The light incident surface 211 may correspond to the light emitting surface 212, and the light emitted from the light source 110 may be incident thereinto.

In detail, the unit lens may guide the light incident into the light incident surface 211 from the light source 110 toward the first emission lens part 300. That is, the unit lens may switch the optical path such that the light emitted from the light source 110 to the light incident surface 211 faces the front side. For example, the unit lens may be a collimator.

The plurality of unit lenses may be integrally formed in the left-right direction "x" to form the one light condensing lens 210. Accordingly, the plurality of light incident surfaces 211 may be repeated in the left-right direction "x" on a rear surface of the one light condensing lens 210, and the plurality of light emitting surfaces 212 may be repeated on a front surface thereof. The light condensing lens 210 may be provided as a plurality of light condensing lenses 210, and the plurality of light condensing lenses 210 may be arranged in the left-right direction.

In the illustrated embodiment, an example is illustrated in which the light condensing lens part 200 includes the three light condensing lenses 210, and the one light condensing lens 210 includes the four light incident surfaces 211 and the four light emitting surfaces 212. However, the number of light condensing lenses 210 and the numbers of light incident surfaces 211 and the light emitting surfaces 212 included in the one light condensing lens 210 are not limited to the illustrated embodiment but may be variously changed depending on the design specifications of the vehicle lamp 10.

Further, referring to FIGS. 2, 3, and 10 to 12, the light emitting surface 212 may be formed as a surface curved convexly toward the front side. Further, a vertical curvature and a horizontal curvature of the light emitting surface 212 may be differently formed.

In detail, the unit lens may be an aspherical lens in which the vertical focal point and the horizontal focal point of the light emitting surface 212 are formed differently. A shape of the individual light distribution pattern may be adjusted through an optimized design of the vertical curvature and the horizontal curvature of the light emitting surface 212.

Further, for example, the light emitting surface 212 may be a curved surface that is asymmetric in the up-down direction or the left-right direction with respect to the optical axis of each unit lens. Further, for example, the plurality of light emitting surfaces 212 may be formed in the same shape or may be formed in different shapes.

Accordingly, distortion due to the bent shape of the second emission lens part 400 may be improved through the design of each unit lens.

An effect of the unit lens according to the embodiment of the present disclosure will be described with reference to FIGS. 10 to 12. FIG. 10A is a view illustrating a horizontal optical path by the unit lens according to an example of the present disclosure, and FIG. 10B is a view illustrating the horizontal optical path when an optical path by the unit lens is viewed from above according to a comparative example of the present disclosure.

FIG. 11A is a view illustrating a vertical optical path by the unit lens according to the example of the present disclosure, and FIG. 11B is a view illustrating the vertical optical path when the optical path by the unit lens is viewed from above according to the comparative example of the present disclosure.

FIG. 12A is an image illustrating a light distribution pattern when the unit lens according to the example of the present disclosure is used, and FIG. 12B is an image illustrating the light distribution pattern when the unit lens according to the comparative example of the present disclosure is used.

The unit lens according to the comparative example applied to FIGS. 10 to 12 is a widely-known collimator using an aspherical lens having the same vertical curvature and the same horizontal curvature and is a lens that converts the light emitted from the light source 110 into parallel light to guide the parallel light to the front.

Referring to FIG. 10B, FIG. 11B, and FIG. 12B, the light distribution pattern by the unit lens according to the comparative example is formed vertically and horizontally symmetrical with respect to the optical axis.

On the other hand, referring to FIG. 10A, FIG. 11A, and FIG. 12A, when the unit lens according to the embodiment of the present disclosure is used, the light distribution pattern is formed asymmetrically in the vertical direction "z" with respect to the optical axis, and the upper area of the optical axis is formed larger than the lower area of the optical axis.

In this way, when the unit lens according to the embodiment of the present disclosure is applied, a light diffusion angle of the emitted light is adjusted by optical characteristics of the unit lens, and thus a light distribution pattern distributed wider in an upward direction than in a downward direction with respect to the optical axis may be implemented. Accordingly, the individual light distribution pattern that may satisfy light distribution performance of the intelligent head lamp may be implemented.

In detail, the light forming a beam pattern of the IFS or the ADB lamp that is the intelligent head lamp travels within an inclination angle of about 5° or more in an upward direction and about −2° to −3° in a downward direction with respect to the optical axis. Accordingly, a vertically asymmetric light distribution pattern may be formed.

When a collimator according to the related art is used, the light travels parallel to the optical axis, the light distribution pattern that is vertically symmetric with respect to the optical axis is formed, and thus it is difficult to implement the light distribution pattern that satisfies the light distribution performance of the intelligent head lamp. On the other hand, when the unit lens of the light condensing lens 210 according to the embodiment of the present disclosure is used, the shape of the individual light distribution pattern that satisfies the light distribution performance of the intelligent head lamp may be implemented through design of the vertical focal point and the horizontal focal point of the light emitting surface 212.

Meanwhile, the first emission lens part 300 may include a plurality of optical lenses 310. The plurality of optical lenses 310 may be arranged in the left-right direction "x," and may be provided to correspond to the plurality of light condensing lenses 210, respectively. In detail, the number of optical lenses 310 may correspond to the number of light condensing lenses 210, and each of the optical lenses 310 may be disposed in front of a corresponding light condensing lens 210.

Here, each of the plurality of optical lenses 310 may include an incident surface 311 and an emission surface 312. The light may be incident into the incident surface 311 from the light condensing lens 210. Further, the emission surface 312 may be provided to emit the light incident into the incident surface 311 to the second emission lens part 400.

Further, the emission surface 312 may be bent rearward from the other end to the one end in the left-right direction "x."

In detail, referring to FIGS. 1, 4, and 5, the emission surface 312 of the optical lens 310 may be bent in an opposite direction to a bent direction of the second emission lens part 400. For example, when the second emission lens part 400 is bent rearward from the one end to the other end, the emission surface 312 may be bent rearward from the other end to the one end.

Here, the bent direction of the second emission lens part 400 may be determined according to an exterior design of the vehicle as described above. When the vehicle lamp 10 is turned on, a continuous lighting image may be implemented by the integrated second emission lens part 400.

Further, as the light emitting surface 212 of each of the optical lenses 310 is bent in the opposite direction to the bent direction of the second emission lens part 400, distortion caused by the bent shape of the second emission lens part 400 may be improved, and the intended light distribution pattern may be formed on the front side. Accordingly, the degree of freedom in designing the exterior of the vehicle and designing the vehicle lamp 10 may be improved, and a slim lamp in the left-right direction "x" may be implemented.

Further, for example, the plurality of optical lenses 310 may be formed in different shapes. For example, a degree of bending of the light emitting surface 212 in the optical lens 310 disposed on one side is greater than a degree of bending of the light emitting surface 212 in the optical lens 310 disposed on the other side. However, the shape of the optical lens 310 is not limited to the illustrated embodiment and may be formed in the same shape according to the design specifications of the vehicle lamp 10.

Meanwhile, FIGS. 4 and 5 illustrate the optical path and the virtual focal points FV1, FV2, FV3, FH1, FH2, and FH3 according to optical characteristics of each of the optical lenses 310.

Referring to the drawings, each of the optical lenses 310 may form a virtual focal point behind a corresponding light condensing lens 210. Further, a distance between the vertical virtual focal points FV1, FV2, and FV3 and the incident surface 311 of the optical lens 310 may be greater than a distance between the horizontal virtual focal points FH1, FH2, and FH3 and the incident surface 311 of the optical lens 310 (see FIG. 5).

In detail, the optical lens 310 may be a lens having a horizontal curvature and a vertical curvature that are different from each other. Accordingly, the vertical virtual focal points FV1, FV2, and FV3 and the horizontal virtual focal points FH1, FH2, and FH3 of the optical lens 310 may be different from each other. For example, the horizontal curvature may be greater than the vertical curvature, and accordingly, the vertical virtual focal points FV1, FV2, and FV3 and the virtual focal surface may be located behind the horizontal virtual focal points FH1, FH2, and FH3 and the virtual focal surface.

Meanwhile, a shape of the virtual pattern formed on the virtual focal surface will be described in detail with reference to FIGS. 6 to 9. For reference, the virtual focal surface is a virtual surface in which the virtual focal point FV1 extends in a direction perpendicular to the optical axis (see FIGS. 4 and 5), but FIGS. 6 to 9 illustrate the virtual focal surface such that the virtual focal surface is seen from the front when the optical path is viewed from the side, to describe the virtual focal point FV1 and the virtual pattern.

FIG. 6 illustrates the vertical virtual focal point FV1 and the virtual focal surface according to the optical characteristics of the first emission lens part 300. As illustrated, the virtual focal point FV1 and the virtual focal surface may be formed behind the unit lens and the light source 110.

FIG. 7 is a view illustrating the virtual vertical optical path in which the emitted light extends toward the rear side of the first emission lens part 300 and the vertical virtual pattern formed on the virtual focal surface by the virtual vertical optical path. Referring to the illustrated embodiment, it may be identified that the virtual pattern is formed asymmetrically in the vertical direction "z" with respect to the virtual focal point FV1.

In detail, the virtual pattern may be formed such that an upper area is smaller than a lower area with respect to the virtual focal point FV1. Accordingly, the light distribution pattern or the high beam pattern emitted through the first emission lens part 300 may be formed such that the upper area is larger than the lower area with respect to the optical axis.

FIG. 8 illustrates the horizontal virtual focal point FH1 and the virtual focal surface according to the optical characteristics of the first emission lens part 300. As illustrated, the virtual focal point FH1 and the virtual focal surface may be formed behind the unit lens and the light source 110.

FIG. 9 is a view illustrating the virtual horizontal optical path in which the emitted light extends toward the rear side of the first emission lens part 300 and the horizontal virtual pattern formed on the virtual focal surface by the virtual horizontal optical path. Referring to the illustrated embodiment, it may be identified that the virtual pattern is formed symmetrically in the left-right direction "x" with respect to the virtual focal point FH1.

Accordingly, the light distribution patterns may overlap with each other, so that uniformity of the entire high beam pattern may be improved.

According to the embodiment of the present disclosure, the light distribution pattern may be adjusted using optical characteristics of the light condensing lens part. Further, according to the embodiment of the present disclosure, light condensing efficiency may be improved by the light condensing lens part, and at the same time, distortion caused by the bent shape of the emission lens may be corrected through individual design of the plurality of light emitting surfaces. Thus, optical efficiency may be improved.

Further, according to the embodiment of the present disclosure, because the light source may be disposed in the left-right direction, a volume may be minimized, and thus a slim lamp in the left-right direction may be implemented.

A vehicle lamp according to an embodiment of the present disclosure may have at least one of the following effects.

According to the embodiment of the present disclosure, a light distribution pattern may be adjusted using optical characteristics of a light condensing lens part.

According to the embodiment of the present disclosure, light condensing efficiency may be improved by a light condensing lens part, and at the same time, distortion caused by the bent shape of the emission lens may be corrected through individual design of the plurality of light emitting surfaces. Thus, optical efficiency may be improved.

According to the embodiment of the present disclosure, because a light source may be disposed in a left-right direction, a volume may be minimized, and thus a slim lamp in the left-right direction may be implemented.

Various embodiments of the present disclosure do not list all available combinations but are for describing a representative aspect of the present disclosure, and descriptions of various embodiments may be applied independently or may be applied through a combination of two or more.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A vehicle lamp, comprising:

a light source part including a plurality of light sources configured to generate light;

a light condensing lens part provided in front of the light source part, corresponding to the plurality of light sources, and including a plurality of light emitting surfaces from which the light is emitted; and a first emission lens part provided in front of the light condensing lens part, the first emission lens part being configured to emit the light incident from the plurality of light sources to form a plurality of light distribution patterns, wherein the plurality of light distribution patterns are configured to overlap each other to form a high beam pattern, and wherein the light emitting surfaces are configured to form the light distribution patterns into a shape vertically asymmetric with respect to an optical axis of the first emission lens part, such that an area of an upper portion of the light distribution patterns with regard to the optical axis is different from an area of a lower portion of the light distribution pattern with respect to the optical axis, wherein the first emission lens part includes a plurality of optical lenses arranged in a left-right direction and respectively corresponding to the plurality of light sources, wherein each of the optical lenses are configured to form a virtual focal point behind a corresponding one of the plurality of light emitting surfaces, and wherein a first distance between a vertical virtual focal point and an incident surface of the optical lens is greater than a second distance between a horizontal virtual focal point and the incident surface of the optical lens.

2. The vehicle lamp of claim 1, wherein the light condensing lens part further comprises:

a plurality of light condensing lenses arranged in a left-right direction, wherein each of the plurality of light condensing lenses includes a plurality of unit lenses integrally formed and arranged in the left-right direction, and wherein each of the unit lenses includes:

the light emitting surface; and a light incident surface which corresponds to the light emitting surface and into which the light emitted from the light source is incident.

3. The vehicle lamp of claim 2, wherein each light emitting surface is configured as a curved surface convex toward the front and includes a vertical curvature being different from a horizontal curvature of the light emitting surface.

4. The vehicle lamp of claim 2, further comprising:

a second emission lens part provided in front of the first emission lens part and formed in a second shape different from a first shape of the first emission lens part, the second shape being convex and the first shape being segmented into a plurality of optical lenses, wherein the second emission lens part is configured to be bent rearward from one end to the other end with respect to the left-right direction.

5. The vehicle lamp of claim 4, wherein each of the optical lenses includes:

the incident surface into which the light is incident from the light condensing lens; and an emission surface configured to emit the light incident into the incident surface to the second emission lens part, and wherein the emission surface is configured to be bent rearward from the other end to the one end with respect to the left-right direction.

6. The vehicle lamp of claim 1, wherein the plurality of light sources are arranged in a left-right direction and arranged on the same plane.

7. A vehicle lamp, comprising:

a light source part including a plurality of light sources configured to generate light;

a light condensing lens part provided in front of the light source part, corresponding to the plurality of light sources, and including a plurality of light emitting surfaces from which the light is emitted; and a first emission lens part provided in front of the light condensing lens part, the first emission lens part being configured to emit the light incident from the plurality of light sources to form a plurality of light distribution patterns, wherein the plurality of light distribution patterns are configured to overlap each other to form a high beam pattern, and wherein the light emitting surfaces are configured to form the light distribution patterns into a shape vertically asymmetric with respect to an optical axis of the first emission lens part, such that an area of an upper portion of the light distribution patterns with regard to the optical axis is different from an area of a lower portion of the light distribution pattern with respect to the optical axis, wherein a virtual focal surface is a virtual plane passing through a virtual focal point that is a point formed behind the light condensing lens part as an optical path formed by optical characteristics of the first emission lens part extending from and perpendicular to the optical axis, wherein a virtual pattern is a virtual optical pattern formed on the virtual focal surface by a virtual optical path in which emitted light that is the light emitted from the first emission lens part extends to a rear side of the first emission lens part, and wherein the virtual pattern is formed asymmetrically in a vertical direction with respect to the virtual focal point.

8. The vehicle lamp of claim 7, wherein the virtual pattern is configured to be formed such that an upper area is smaller than a lower area with respect to the virtual focal point.

9. The vehicle lamp of claim 7, wherein the virtual pattern is configured to be formed symmetrically in a left-right direction with respect to the virtual focal point.

* * * * *